United States Patent [19]

Peled

[11] 4,335,191

[45] Jun. 15, 1982

[54] LITHIUM CELLS

[75] Inventor: Emanuel Peled, Even Yehuda, Israel

[73] Assignee: Tadiran Israel Electronics Industries Ltd., Tel-Aviv, Israel

[21] Appl. No.: 172,688

[22] Filed: Jul. 28, 1980

[51] Int. Cl.³ .................................................. H01M 4/00
[52] U.S. Cl. ...................................... 429/94; 429/105; 429/196
[58] Field of Search .................. 429/94, 105, 196, 101

[56] References Cited

U.S. PATENT DOCUMENTS

| | | | |
|---|---|---|---|
| 4,042,756 | 8/1977 | Goebel et al. | 429/94 |
| 4,091,182 | 5/1978 | Farrington et al. | 429/105 X |
| 4,154,905 | 5/1979 | Urry | 429/94 |
| 4,184,012 | 1/1980 | Barrella | 429/94 |
| 4,184,014 | 1/1980 | Dey | 429/105 |
| 4,200,684 | 4/1980 | Bro | 429/94 X |
| 4,237,199 | 12/1980 | Gelin | 429/94 |
| 4,238,552 | 12/1980 | Dey et al. | 429/101 |

*Primary Examiner*—Charles F. LeFevour
*Attorney, Agent, or Firm*—Fleit & Jacobson

[57] ABSTRACT

The present invention relates to lithium cells of the wound electrode high power type, with reduced short-circuit current, wherein the short-circuit current is reduced by the use of an electrolyte of reduced concentration or activity, or by the use of an electrode of lithium alloyed with magnesium, calcium, aluminum, cadmium or silicon.

5 Claims, No Drawings

LITHIUM CELLS

FIELD OF THE INVENTION

The present invention relates to improved lithium cells, and more particularly to high-power lithium cells of the spirally wound electrode type. High power (HP) lithium cells of various constructions are well known. Such cells have generally an oxidizable lithium anode, a carbon current collector and an electrolytic solution between these and in contact with the two electrodes, said electrolyte comprising an oxyhalide solvent, such as thionyl chloride, sulfuryl chloride, phosphorus oxychloride or the like which contains a solute such as $LiAlCl_4$, $LiBCl_4$, or the like. High power cells of this type are often constructed with spiral electrode configurations, and thus they have a quite large surface area of the electrodes. When such a high power cell is short-circuited, either internally or externally, overpressurization and violent explosions have happened. This seems to be due to the fact that during short-circuiting the lithium can be heated above its melting point, and in this state it is apt to react violently with elemental sulfur generated during the discharge of the cell or with the electrolyte. When such cells are discharged at too high a current, they are also likely to heat up above a temperature of about 119° C., melting sulfur which reacts with the metallic lithium in a violent manner. The phenomenon of exploding Li-cells has been dealt with in various reports, see Dey ECOM 74-0109-6 Nov 1975, and Marincic et al., ECOM 74-0108-6 December 1975. This phenomenon is known in high power (HP) Li-cells of D-size as well as in other size cells, like C, AA etc, which have very thin Li electrodes of large surface area, a carbon or similar current collector and a thin separator between these. In a D-size cell the effective electrode area is about 200–400 cm², and such cells have a short-circuit current of the order of 20 A to 30 A (max) and 10 A (steady). Such short-circuit currents bring about a violent explosion within minutes. Such explosions are dangerous, persons may be severely injured and equipment damaged or destroyed. In order to avoid such explosions such cells are frequently equipped with an external safety fuse of about 4 A or with a safety plug or vent adapted to yield at a pressure of about 200 to 400 psi. These safety devices are not reliable enough. The external fuse is of no use when an internal short circuit happens. The pressure plug results in an opening up of the cell and highly corrosive and noxious electrolyte is sprayed on the environment.

SUMMARY OF THE INVENTION

Inorganic HP-lithium cells have a large excess of unutilized current output. According to the present invention the above drawbacks of such Li-cells are overcome by providing means adapted to decrease the output by electrochemical or chemical means, resulting in a maximum current well below that which results in a deformation or explosion of such cells. In this specification the term HP-cells refers to lithium cells having a wound electrode.

The danger of explosion of high-power (HP) lithium cells upon short-circuiting such cells (either internally or externally) is eliminated according to the present invention by providing means for decreasing the short-circuit current of the cells to such values that overheating and possible explosions are eliminated.

The decrease of the short-circuit current of the cell can be attained by various means, the measure of success of the means used being the decrease of the short-circuit current upon internal or external short-circuiting of such cells.

Amongst means resorted to for eliminating the danger of explosions of HP-lithium cells upon short-circuiting such cells there are:

a. Decreasing the concentration of the electrolyte to such values that certain maximum current intensities are not exceeded;

b. Coating the lithium anode by another metal, such as Na, Ca, Ba;

c. Using lithium alloys containing a predetermined atom-percentage of metals adapted to decrease maximum current intensity upon short-circuiting. Suitable metals are for example Ca, Mg, Cd, and the element Si at atom percents of from 1 to 15%;

d. Adding a Lewis acid to the electrolyte. Amongst suitable additives there may be mentioned $SnCl_4$ and $SbCl_5$;

e. Using a separator adapted to limit maximum current intensities.

When, for example conventional electrolyte concentrations are decreased from values of about 1.8 M to about 0.1 to 0.6 M, depending on the maximum current intensity and on the degree of safety desired, and on the surface area of the electrodes, dangerous current intensities are eliminated.

Using alloys of lithium with Si, Na, Cd, Al, Ca, decreases maximum currents, the effect being more pronounced as the percentage of the above added component increases.

DETAILED DESCRIPTION OF THE INVENTION

Example 1

Lithium Cell of Conventional Design (Not part of the invention.)

Lithium cells having an electrode area of 10 cm² were constructed from lithium sheet of 0.4 mm thickness, pressed against a current collector made from carbon powder with teflon powder as binder, produced at a high pressure. The cathode had a thickness of 1 mm. Between the anode and the cathode there was positioned a glass fiber separator, thickness: 0.2 mm. The arrangement was inserted into a glass cell which was vacuum tight. As electrolyte there was introduced thionyl chloride containing 1.8 M $LiAlCl_4$. The short circuit current of this cell was 1.4 A after 1 minute. It can be calculated that a high-power (HP) cell, D-size of 200 cm² electrode area will have a short circuit current after 1 minute of about 28 A. The electric capacity is 0.33 Ahr, at current density 6.3 MA/cm². The work voltage of such a cell is about 3.05 V.

Example 2

Lithium Cell-Low Electrolyte Concentration

A cell similar to that of Example 1 was built, but the electrolyte was 0.3 M $LiAlCl_4$ in thionyl chloride. The short circuit current was 0.4 A after 1 minute and 0.2 A after 5 minutes.

The electric capacity of the cell is 0.2 Ahr, at current density 3 MA cm², i.e. about 60% of that of the cell of Example 1. Working voltage of this cell was above 3 V.

Example 3

Limited Electrolyte Concentration Li-Cells

Cells were built according to Example 1, but with 0.5 M LiAlCl$_4$ in thionyl chloride. Short circuit current was 0.55 A after 1 minute of short and 0.35 A after 5 minutes.

The capacity was 0.28 Ahr at 4.8 MA/cm$^2$, i.e. about 20 percent less than that of the cell with the 1.8 M electrolyte. Working voltage was above 3.0 v.

Example 4

D-Size HP-Li-Cells (Not part of the Invention.)

D-size HP-Li-cells were built with an electrode area of about 220 cm$^2$, the Li anode had a thickness of 0.6 mm, that of the carbon current collector was 1 mm, with a separator of 0.18 mm between them. The cells were sealed in a steel container with a glass-metal seal. The cells were of the HP-type, and the electrolyte used was 1.8 M LiAlCl$_4$ in thionyl chloride. The cell was shorted in a safety device. The maximum short circuit current was 25 to 30 A and the cells exploded within 2 to 3 minutes in a violent manner. At a current of 250 mA the output was 13 Ahr.

Example 5

Limited Electrolyte Concentration D-Size Li-Cells

Cells were built according to Example 4 but with an electrolyte of 0.3 M LiAlCl$_4$. The short circuit current after 1 minute was 12 A and this decreased sharply after 3 minutes to 3 A, decreasing further to 2 A after 10 minutes. The cells did not explode and were not damaged after 30 minutes of short circuit current.

At 250 mA current the capacity was 8.5 Ahr, i.e. 65% of the cell of Example 4; the working voltage being 3 V.

Example 6

Modified Electrolyte HP-Type Cells

A lithium cell was built according to Example 1. The electrolyte used was 0.9 M NaAlCl$_4$ and 0.9 M LiAlCl$_4$ in thionyl chloride. Short circuit current was 0.4. After 1 minute and 0.5 A after 5 minutes. Capacity was 0.3 Ahr at 3.0 V at 4 mA/cm$^2$, i.e. 10% less than that of the cell of Example 1. The short circuit current was similar to that of the cells with 0.3 M LiAlCl$_4$.

Example 7

Modified Electrolyte Li-Cell

A cell was built according to Example 1 and the electrolyte used was 0.9 M LiAlCl$_4$ + 0.9 M KAlCl$_4$ in thionyl chloride. Short-circuit current was at its maximum 1.0 A, which decreased to 0.2 A after 1 minute and 0.15 A after 5 minutes. The capacity of the cell was 0.3 Ahr at above 3.0 V at current density of 3 mA/cm$^2$.

Example 8

Modified Anode Li-Cells HP

Cells were built according to Example 4 the electrolyte being 0.4 M LiAlCl$_4$, but the anode was made from a Li/Mg alloy containing 2 atom-% magnesium. The maximum short-circuit current was 10 A. The cells did not explode or deteriorate externally. The output was 10 Ahr at 250 mA and the working voltage was 2.7 V.

Example 9

Modified Anode Li-HP Cells

Cells were built according to Example 4 the electrolyte being 0.3 M LiAlCl$_4$, but with anodes of Li-Ca alloy containing 5 atom-% calcium. The cells were shorted and maximum current was 12 A. The cells did not explode. The output was 11 Ahr at 2.8 V and 250 mA.

What is claimed is:

1. In a lithium cell of the wound-electrode high power type comprising an oxidizable lithium anode, a current collector, an electrolyte comprising a solute selected from the group consisting of LiAlCl$_4$, LiBCl$_4$ and mixtures thereof dissolved in an oxyhalide solvent, the improvement which comprises employing a concentration of the solute in the electrolyte of between about 0.1 M to 0.6 M, whereby the short-circuit current is reduced, thereby rendering the cell resistant to explosion upon short-circuiting.

2. In a lithium cell of the wound-electrode high power type comprising an oxidizable lithium anode, a current collector, an electrolyte comprising a solute selected from the group consisting of LiAlCl$_4$, LiBCl$_4$ and mixtures thereof dissolved in an oxyhalide solvent, the improvement which comprises employing a concentration of the solute in the electrolyte of between about 0.1 M to 0.6 M, and employing a lithium alloy anode comprising from about 1 to 15 atom % of an alloying element selected from the group consisting of magnesium, calcium, aluminum, cadmium and silicon, whereby the short-circuit current is reduced, thereby rendering the cell resistant to explosion upon short-circuiting.

3. A lithium cell according to claims 1 or 2, wherein the electrolyte comprises in combination LiAlCl$_4$ and NaAlCl$_4$ in thionyl chloride.

4. A lithium cell according to claims 1 or 2 comprising as electrolyte 0.6 M LiAlCl$_4$ in thionyl chloride, and further comprises KAlCl$_4$.

5. A lithium cell according to claims 1 or 2, wherein the alloy is a Li/Mg or a Li/Ca alloy.

* * * * *